July 27, 1965 D. E. CUNNINGHAM 3,197,694
METHOD AND APPARATUS FOR MEASURING MAGNETIC
FIELDS USING RESONANCE RADIATION FROM
A GAS IN THE FIELD
Filed July 9, 1958 3 Sheets-Sheet 2

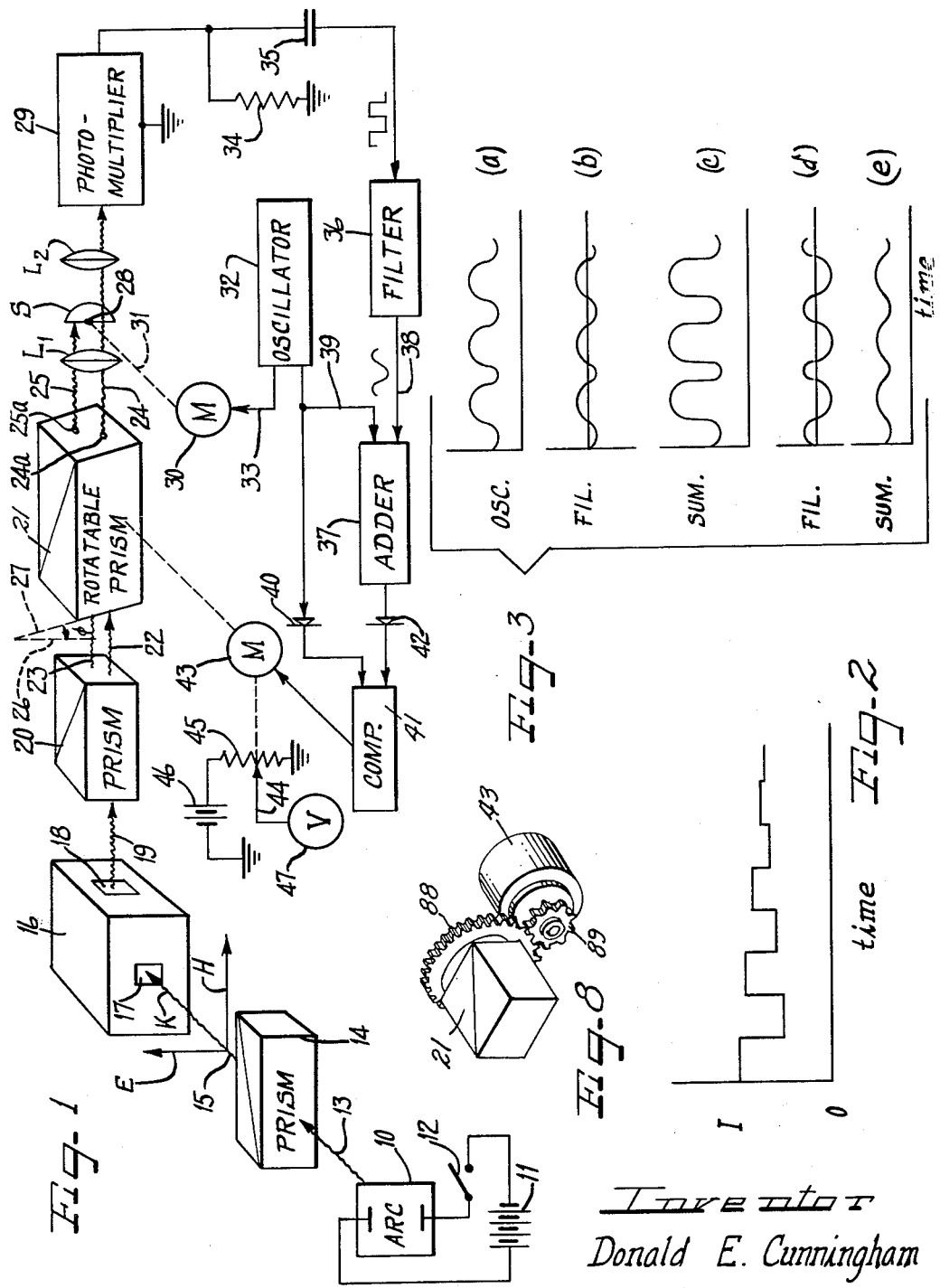

Inventor
Donald E. Cunningham
by Hill, Sherman, Meroni, Gross & Simpson Attys

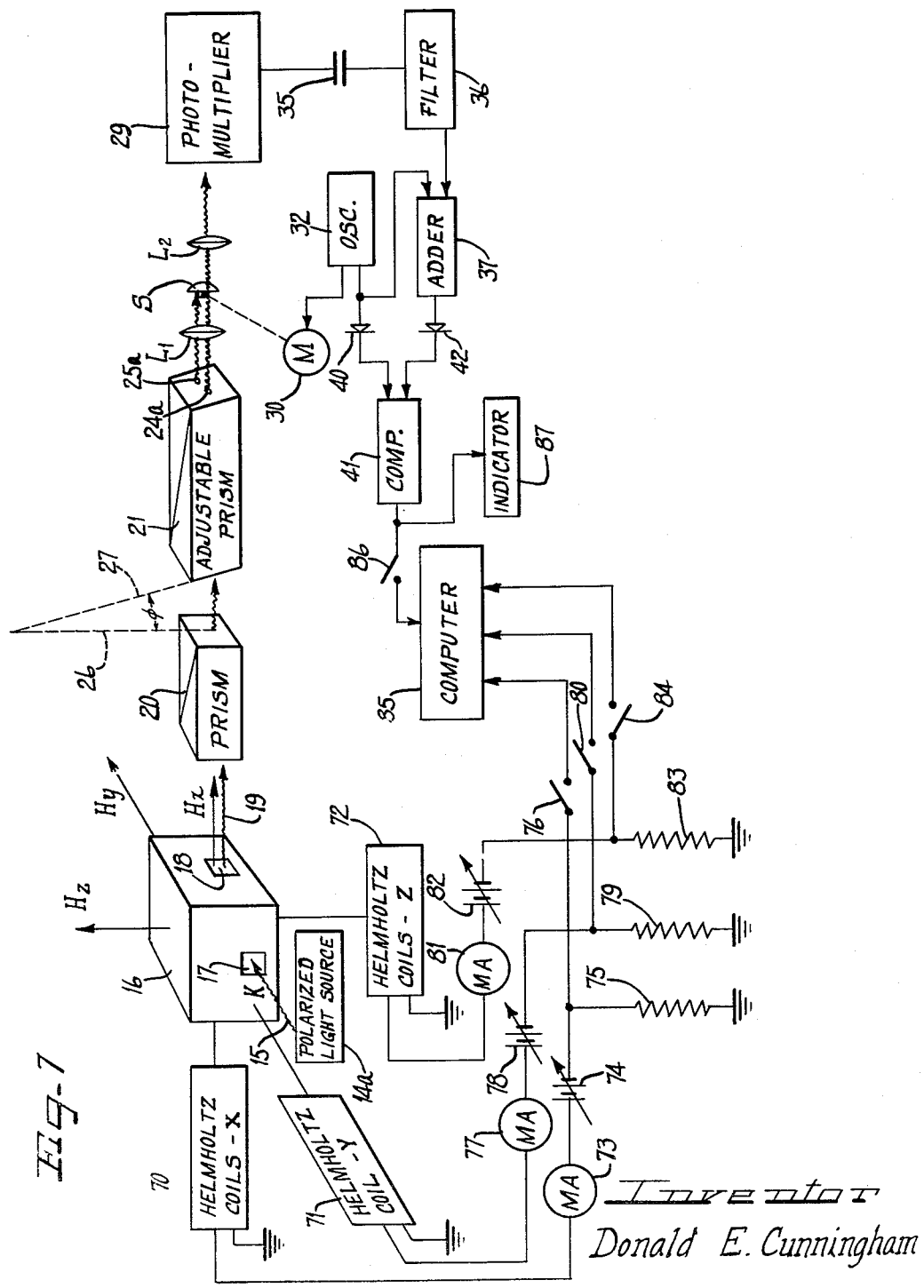

United States Patent Office 3,197,694
Patented July 27, 1965

3,197,694
METHOD AND APPARATUS FOR MEASURING MAGNETIC FIELDS USING RESONANCE RADIATION FROM A GAS IN THE FIELD
Donald E. Cunningham, Cleveland, Ohio, assignor to Thompson Products, Inc., Cleveland, Ohio, a corporation of Ohio
Filed July 9, 1958, Ser. No. 747,480
17 Claims. (Cl. 324—43)

This invention relates to a method and apparatus for measuring magnetic fields. More particularly, this invention relates to a method and apparatus for measuring magnetic fields by utilizing resonance radiation from a gas or vapor to provide a magnetic field sensor of high accuracy which, at the same time, is sensitive to very small fields. In the measuring device elementary particles, such as atoms, are used as the sensing elements, and light, is employed as a means of interrogating the system. Broadly, the effect of the magnetic field on the polarization of emitted resonance radiation is taken as a measure of the magnetic field. The method and apparatus of the present invention may suitably be used for laboratory testing and measuring, in submarine detection systems, in magnetic mapping or navigation systems, in geological exploration, or the like.

Certain phenomena associated with resonance radiation from a gas have for some time been studied widely in connection with studies of the atomic structure of the gas as revealed by spectrum analysis. In particular, one phenomenon closely related to those discussed herein is discussed in the literature of the general field of magneto-optics as "the anomolous Zeeman effect." In these studies of atomic structure by means of resonance radiation however, no attempt has in the past been made to use the properties of the emitted radiation as an indication of the magnitude or direction of an unknown magnetic field present in the vicinity of the radiating material.

As a definition of the term "resonance radiation" for the purpose of this specification, it is sufficient to state that if unexcited atoms absorb optical energy of a certain frequency and then in the process of relaxation re-emit the energy at the same frequency, the emitted light is said to be "resonance radiation." In terms of the simple quantum picture of atomic structure, this process can be thought of as a jump from the normal energy state of the atom to a discrete energy state higher in energy. The electron, bearer of the excitation energy, remains in the excited state for a certain time (commonly known as the state's lifetime), and then returns to the ground state by the emission of a photon of energy equal to the gap in energy between the two states; hence, equal to the original energy absorbed. The characteristics of the two states in question are, of course, determined by the fields in which the atoms find themselves, and it is in this way that the effects observed give valuable information either about the atomic state in accordance with known procedures, or about the atomic states environment in accordance with the teachings of the present invention.

For a more complete discussion of the physical theory of these resonance radiation phenomena utilized in the present invention, reference is, for example, made to chapter 19 of a book entitled, "Fundamentals of Physical Optics" by F. A. Jenkins and H. E. White, published by McGraw Hill Co., Inc., New York and London, 1937, or to a book entitled, "Resonance Radiation and Excited Atoms," by A. C. G. Mitchell and M. W. Zemansky, published in 1934 by the Cambridge University Press, London, England. As will become apparent from the discussion below, the phenomenon of resonance radiation is, by the present invention, utilized to provide an apparatus for detecting magnetic fields which is simultaneously light in weight, compact, and extremely accurate and sensitive in measuring smaller magnetic fields than has heretofore been possible. By virtue of these characteristics, the method and apparatus is suited for a wide range of applications including laboratory testing and measuring apparatus, submarine detection, terrestrial magnetic mapping or navigation, and mapping of magnetic fields in space.

It is therefore an object of the present invention to provide a method and apparatus for measuring magnetic fields by utilizing resonance radiation.

It is a further object of this invention to provide a method of measuring extremely small magnetic field and extremely small variations in magnetic fields with a high degree of accuracy.

It is a further object of this invention to provide an electro-optical apparatus for measuring small magnetic fields to a high degree of accuracy which apparatus is compact, and light in weight.

It is a further object of this invention to provide a method and apparatus of measuring magnetic fields by measuring the change in polarization of resonance radiation from gases in the magnetic field which preferably have a long excited-state life-time in order to increase the sensitivity of measurement.

It is a further object of this invention to provide a method and apparatus for measuring magnetic fields by balancing out the field to be measured with a suitable configuration of Helmholtz coils or other field generating apparatus, the zero or null field condition being indicated by the characteristics of resonance radiation from a resonance tube in the zero field region and the properties of the unknown field being indicated by the currents in the Helmholtz coils.

It is a further object of this invention to provide an apparatus for measuring the magnitude of a magnetic field which apparatus includes a servo system for continuously adjusting the apparatus to provide a voltage or other output signal which varies continuously in accordance with variations of a changing magnetic field.

While the novel and distinctive features of the invention are particularly pointed out in the appended claims, a more expository treatment of the invention, in principle and in detail, together with additional objects and advantages thereof, is afforded by the following description and accompanying drawing in which like reference characters are used to refer to like parts throughout and wherein;

FIGURE 1 is a partly schematic and partly block diagram of one embodiment of the present invention.

FIGURE 2 is a graph in which the current output of the photo-multiplier shown in FIGURE 1 is plotted as ordinate against time as abscissa to illustrate the operation of the system of FIGURE 1.

FIGURE 3 is a group of volt-time wave form diagrams further illustrating the operation of the system of FIGURE 1.

FIGURE 7 is a partially schematic partially block diagram of another embodiment of the system.

FIGURE 8 is an isometric view of the rotatable prism of the present invention with its associated drive.

Figure 4:
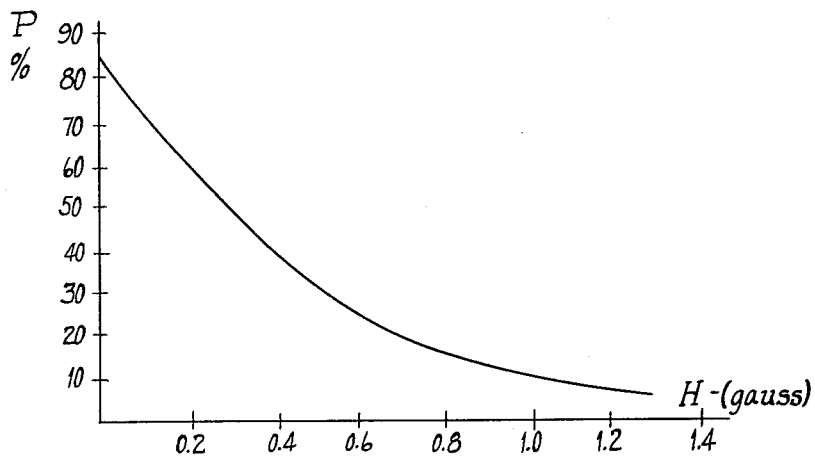
FIGURE 4 is a graph showing the polarization of resonance radiation emitted from mercury gas plotted as ordinate against the field strength of the applied magnetic field plotted as abscissa.

In certain applications it is necessary to accurately measure the magnitude of a magnetic field the direction of which is known or can be readily determined. For example, in many laboratory applications or in submarine detection systems in which a moving craft or vehicle carries magnetic field detecting apparatus, the direction of an ambient magnetic field such as the earth's magnetic field is normally known. In the submarine detection case, it is then desired to measure the magnitude of the field or, more specifically, to accurately measure small changes in magnitude of the field due to the presence of a submarine or other field disturbing source. The apparatus shown in FIGURE 1 is particularly adapted to continuous measurement of a magnetic field of fixed or continuously varying magnitude the direction of which is known and is indicated in FIGURE 1 by the arrow H. If the direction of the field also varies with the motion of any craft carrying the apparatus, it will, of course, be understood that the entire apparatus may be mounted upon any suitable table or platform the orientation of which is controlled or continuously varied in any convenient known manner so that the direction of the ambient magnetic field H with respect to the direction of the ray of light indicated by the arrow K (and consequently with respect to the rest of the apparatus) is maintained constant.

The magnetic field measuring apparatus shown in FIGURE 1 comprises a light source, a polarizer, resonance tube, an analyzer, a light receiving apparatus, an electro-optical transducer, and an electrical servo system to control the position of the analyzer and simultaneously provide an electrical output signal the magnitude of which is a known function of the magnitude of the magnetic field applied to the resonance tube. In the apparatus shown by way of example in FIGURE 1, the light source comprises a mercury arc source 10 which may, for example, be of the type shown in Figure 11A (b) on page 248 of the above-noted book by Jenkins and White. Electrical power for operating the arc 10 may conveniently be derived from any source of voltage such as the battery 11 which is connected to the electrodes of the arc through a switch 12 as shown. This mercury vapor arc will emit light having a wave length of 2,537 Angstrom units which, as shown by arrow 13, is applied to a polarizer such as the adjustable prism 14. The polarizer 14 may conveniently be a Wollaston prism of the type shown in Figure 14Q (b) at page 329 of the above noted book by Jenkins and White. The polarized light is directed to enter a window 17 in a resonance tube 16. It will be noted that the wave vector or direction of propagation of the wave, 15, as indicated by the arrowhead K, the electric vector E of the plane polarized wave, and the direction of the ambient or applied magnetic field to be measured, as indicated by the vector H, form a set of orthogonal axes, that is to say, the vectors E, K, and H are mutually perpendicular. It will, of course, be understood that the Wollaston prism 14 is preferably mounted in any convenient mechanism so that its position may be controlled by a measured rotation to produce the desired relationship of vectors E, K, and H. Such adjustment is, of course, made during the construction or initial calibration of the system and is made with respect to the table or other fixed support on which the apparatus is mounted. If, as in a submarine detection system, the entire apparatus is to be carried in a vehicle, it will, of course, be understood that this adjustment will be made with respect to a table or a platform which in operation may be rotated as a whole in order to maintain the direction of the magnetic field in the relationship shown by the vector H as the vehicle moves. It will, of course, also be further understood that in the laboratory the apparatus is operated in a darkened room to exclude stray or ambient light and that in a field system a suitable enclosure or cover would be provided for this purpose.

The resonance tube 16 may conveniently comprise a hollow cubical quartz container the inner side of which is coated with light absorbing material except for input window 17 and output window 18. The resonance tube 16 is filled with the vapor of the material from which the incident polarized light is derived. In the exemplary embodiment of FIGURE 1, resonance tube 16 is filled with mercury vapor since a mercury arc is used as the light source. As will be discussed in detail below, other light source and vapor combinations can be used and may indeed be preferable for certain applications. Light ray 13 from arc source 10 is split by prism 14 into two differently polarized output rays. Only one of these polarized rays 15 is shown. It will, of course, be understood that the undesired ray is screened off by any suitable conventional means. The polarized light ray K from prism 14 enters window 17 of resonance tube 16 and is absorbed by the gas or vapor in the tube. Resonance radiation or light of the same frequency as the incident light is emitted by the gas in accordance with the above discussed process. This resonance radiation is observed through window 18.

It will be noted that the resonance radiation or light re-emitted from the atoms of the vapor in the resonance tube 16 is observed in a direction parallel to the direction of the applied magnetic field and perpendicular to both the incident light ray or vector K and the electric vector E thereof. That is to say, the window 18 of the resonance tube 16 is positioned so that the rays 19 of the resonance radiation emitted therethrough are generally in the same direction as that of the magnetic field to be measured. Of course, it will be understood that the radiation in ray 19 results from absorption by the vapor in resonance tube 16 of light in the input ray 15 from polarizer 14 and arc 10 and the subsequent re-emission of light of the same frequency in accordance with the above discussed phenomenon of resonance radiation. The walls of the resonance tube 16, other than windows 17 and 18 are preferably made not only opaque but also light absorbing in order to prevent multiple reflections and scattering of light in the tube.

When the resonance radiation emitted through window 18 in rays 19 is observed in the direction of the applied magnetic field, the quantities or characteristics that can be measured experimentally are either the plane of maximum polarization or the polarization of this light re-emitted from the resonance bulb. The polarization "P" may be defined as $$P = \frac{I_x - I_y}{I_x + I_y}$$

where the $x$ axis coincides with the direction of the arrow K in FIGURE 1 and the $y$ axis coincides with the direction of the vector E in FIGURE 1 and where $I_x$ is the intensity along the $x$ axis whereas $I_y$ is the intensity along the $y$ axis.

Two Wollaston prisms and a photomultiplier tube are used as a means of measurement. As noted above, Wollaston prism 14 is used to obtain light of the proper polarization to direct on resonance bulb 16. Wollaston prism 20 is fixed in position so that its axes have the same relationship to the resonance tube 16 as do the axes of prism 14. Wollaston prism 21 is conveniently mounted in any suitable motor driven mechanism such as one including a motor 43 which drives a ring gear 88 by means of a pinion 89. The prism 21 is mounted on the ring gear so as to rotate therewith. The ring gear 88 must not, of course, interfere with the passage of light through prism 21, and is so constructed and mounted. By this mechanism the prism may be rotated about an axis along the line of observation during operation of the system and is provided with means for measuring or reading the angle through which the optical axes of the prism have been rotated. The ray 19 applied to prism 20 will be divided by the prism into two differently polarized output rays 22 and 23. Each of these rays which are applied to prism 21 will in turn be divided into two output rays from prism 21. Thus, the ray 22 will, for example, be divided into the two output rays 24 and 25. Similarly, the input ray 23 to prism 21 would also be divided into two output rays. Only one pair of the output rays from prism 21 are utilized in the system, the other pair being screened off by any suitable screening means which for the sake of clarity of illustrations is not shown. The output rays resulting from input 23 may thus be neglected and are consequently not shown in FIGURE 1. Of course, it will be understood that the pair of output rays from either input ray to prism 21 may be utilized the choice being purely a matter of convenience. Alternatively, of course, one of the rays 22 or 23 could be screened off.

It is shown in the above-identified book "Resonance Radiation and Excited Atoms" by A. C. G. Mitchell and M. W. Zemansky, that in this type of arrangement the polarization "P" as defined above is also equal to the cosine of $2\phi$ where $\phi$ is the angle through which the prism 21 is rotated with respect to prism 20 or prism 14 in order to produce a pair of outputs having equal intensities. The angle $\phi$ which is to be measured as a measure of the polarization is indicated in FIGURE 1 as the angle formed between the dashed lines 26 and 27 which indicates the relative direction of orientation of the prisms 20 and 21 respectively.

When the light is observed in the direction indicated in FIGURE 1, one would on the basis of a simple classical model of the electron oscillator, expect a polarization of 100% in a magnetic field free region. Such a result is not attained. The reason for this lies in the existence of isotopes in the mercury contained in the resonance bulb. It is well known that naturally occurring mercury consists of seven isotopes to each of which must be attached an energy structure different from the others and each of which behaves differently in a magnetic field. One can, however, compute the polarization of the light emitted from naturally occurring mercury vapor as a function of the applied magnetic field strength, or this polarization as a function of field strength can be readily determined experimentally.

Figure 5:
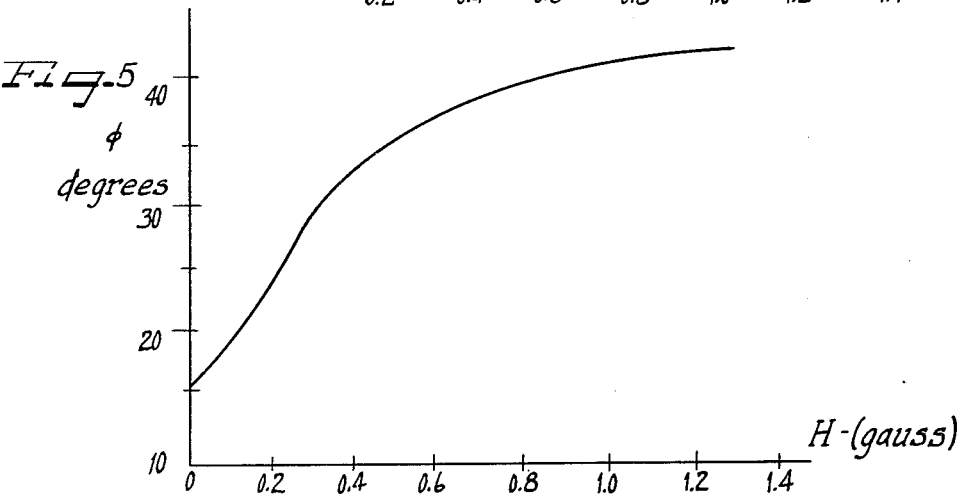
FIGURE 5 is a graph derived from the data shown in FIGURE 4 but in which the angle of rotation of the analyzer or rotatable prism shown in FIGURE 1 is plotted as ordinate against the applied magnetic field plotted as abscissa.

In FIGURE 4 there is shown a graph in which the polarization of mercury vapor resonance radiation observed along the direction of an applied magnetic field is plotted as a percentage of complete polarization as ordinate against the applied field strength H in gauss as abscissa. It will be noted that in a field free region the polarization is slightly less than 85%, and that this polarization drops to less than 10% in a magnetic field of 1.2 gauss. In FIGURE 5, the data shown in FIGURE 4 are re-plotted in terms of the quantities which are actually measured and are of direct interest. That is to say, the data of FIGURE 4 are shown in FIGURE 5 with the angle $\phi$ in degrees plotted as ordinate against the applied field strength H in gauss plotted as abscissa. It will be recalled from the above discussion that the polarization P is equal to the cosin of twice the angle $\phi$.

It will be noted that at zero field the angle $\phi$ between line 27 and line 26 (which is in fixed position parallel to the electric vector E) is approximately 17°. Experimentally, the data shown in FIGURE 5 indicates, for example, that in the system of FIGURE 1 using mercury vapor, the prism 21 must be rotated through an angle of 30° with respect to prisms 20 and 14 in order for the two spots of light 24a and 25a to become of equal intensity when a field of 0.34 gauss is applied to resonance tube 16. It will be recalled that the cosine of 60° (which is twice the angle $\phi$ when $\phi$ is 30°) is 0.5. It will further be noted from FIGURE 4 that the polarization of the light produced by a magnetic field of 0.34 gauss is 50%. It is thus seen that a measurement of the angle $\phi$ affords an indirect measurement of the polarization "P" and also of the strength of the magnetic field H.

The accuracy with which the magnitude of the applied field H or the magnitude of changes in the applied field H can be measured, of course, depends upon the characteristics of the gas used as set forth by way of example for mercury in FIGURES 4 and 5. Thus, it will be noted from FIGURE 5 that if the magnitude of the magnetic field H changes from 0.2 to 0.4 gauss, the angle $\phi$ through which the prism 21 must be rotated to maintain equal intensities of spots 24a and 25a changes from approximately 24° to approximately 33°, a change of 45° per gauss.

This angle $\phi$ can of course be read directly from calibrated scales after manually rotating prism 21. However, if the magnetic field strength is continuously changing, it is desirable to provide a means of deriving an output signal which will change in magnitude as a continuous measure of the change of the applied field. For this purpose, there is provided, as shown in FIGURE 1, a first lense $L_1$ which focuses an image of the two spots 24a and 25a on the plane in which is located a rotating shutter S. The shutter S is mounted for rotation in a plane parallel to the face of the prism 21 upon which the two spots 24a and 25a appear and about an axis or point 28 which, mechanically, may be afforded by any convenient shaft or similar arrangement. The shutter may be of semi-circular shape as shown or may have any other convenient shape so that one and only one of the images of the two spots 24a and 25a is blocked by the shutter during one-half of the period of rotation of the shutter. Thus, the axis of rotation of the shutter S passing through point 28 may conveniently be aligned with a point on the line connecting the two light spots 24a and 25a and midway between these spots on this line. The shutter S in the position shown will, of course, block the image of the spot 25a and permit the image of the spot 24a to be transmitted through a second lense $L_2$ which focuses this image on the cathode of a photomultiplier tube 29. If, for example, the shutter is rotated through 180° then the image of the spot 25a will be transmitted and the image of spot 24a will be blocked. The shutter S may be mechanically driven or rotated by a synchronous A.-C. motor 30 as indicated by the dash line 31. It will, of course, be understood that any convenient or equivalent arrangement for alternately transmitting the image of first one of the spots 24a and then the other of the spots 25a to the photomultiplier 29 at a pre-determined frequency may also be used. In the system shown by way of example in FIGURE 1, the frequency at which the shutter rotates is determined by the frequency of an oscillator 32 one output from which is applied over line 33 to drive the motor 30 which as noted may conveniently be a synchronous alternating current motor.

It is apparent that when the two spots 24a and 25a are of equal intensity, the intensity of light transmitted to the photo-cathode or photomultiplier 29 will be the same no matter what the position of the shutter is and the output of photomultiplier 29 will be a unidirectional current of constant magnitude. If, however, the spot 24a is of greater intensity than the spot 25a, the current output of the photomultiplier 29 will have the form indicated near zero time in the graph of FIGURE 2 which is a plot of this current I as a function of time as the system rotates the prism 21 to a position at which the intensities of the two spots are equal. Thus, it will be noted from FIGURE 2 that with the shutter S in the position shown in FIGURE 1 initially the image of the brighter spot 24a is transmitted to the photomultiplier and its output current I is therefore of a relatively high magnitude. When the shutter rotates sufficiently to block the image of spot 24a and transmit the image of spot 25a, the current drops to a lower value.

It may thus be seen that a pulsating unidirectional current is provided the alternating component of which has a frequency determined by the frequency of rotation of the shutter S and has an amplitude determined by the relative difference in intensities of the spots 24a and 25a. This current flows through a resistor 34 and the voltage developed across resistor 34 is applied to a blocking capacitor 35 which transmits only the alternating current component of the voltage and blocks the D.-C. component. This alternating current component is applied to a filter 36 which is tuned to the fundamental or first harmonic frequency of oscillator 32 and therefore to the frequency of the fundamental or first harmonic of the square wave input to the filter 36. The output of the filter 36 is, of course, a sine wave of the same frequency as the output of oscillator 32. It is desirable to use filter 36 in order to derive a sine wave output and to eliminate minor transients from the output of photo-multiplier 29 which may result in higher frequency components in the input signal to the filter.

The output of filter 36 is applied to an adder or adding circuit 37 over a line 38. An output derived from oscillator 32 is applied to the second input of the adder circuit 37 over a line 39. This same output from oscillator 32 is also applied through a rectifier 40 to a comparison circuit 41. The output from adder 37 is similarly applied through a rectifier 42 as the second input to the comparison circuit 41. The output from the comparison circuit will be a unidirectional voltage which may be used to drive a servo-mechanism motor 43 which in turn drives any convenient mechanism to rotate prism 21 and also drives the pick-off arm 44 of a potentiometer 45. The comparison circuit 41, motor 43, and potentiometer 45 may be of the type commonly used as servo-multipliers in electronic analog computers. As is well known, the direction of rotation of such a motor is controlled by the polarity of its input voltage and the motor will stop when the magnitude of the input voltage reaches zero. A battery or other source of voltage 46 may be connected to one end of potentiometer 45 the other end of which is connected through ground to the other side of battery 46. The voltage appearing at the pick-off arm 44 of potentiometer 45 may be applied to a volt-meter, an oscilloscope or other indicating, measuring or controlling devices. This voltage on the pick-off arm 44 will be a measure of the magnitude of the magnetic field H applied to the resonance tube 16.

Turning now to a consideration of the operation of the system shown in FIGURE 1 as illustrated by the wave form diagrams in FIGURES 2 and 3, it will be noted that the shutter S acts essentially as a chopper for the light emitted from each of the spots 24a and 25a on rotatable prism 21. Thus, the light from each of these spots falls alternately on the cathode of photomultiplier 29 thereby producing a square wave output from the photomultiplier the A.-C. amplitude of which is directly proportional to the difference in intensity between the spots and the frequency of which is determined by the rate at which motor 30 drives the shutter S. Of course, when the spots have equal intensity, this output will have a zero A.-C. amplitude and become a pure D.-C. signal. The output from photo-multiplier 29 is applied through a capacitor 35 which blocks the D.-C. component and passes the A.-C. component to filter 36. As indicated in FIGURE 1, the input to filter 36 is the above noted square wave whereas the output of the filter, which is tuned to the fundamental frequency of this square wave as determined by the frequency of oscillator 32 driving motor 30, will be a sine wave which is the fundamental or first harmonic of the square wave input. The filter output and a reference output derived from oscillator 32 are applied to adder 37. The oscillator 32 also provides a sine wave output which is applied over line 33 to drive the motor 30.

The oscillator reference output on line 39 is shown in graph a of FIGURE 3 whereas the filter output on line 38 is shown for the two cases in which it is either directly in phase with or 180° out of phase with the output of oscillator 39 in graphs b and d respectively of FIGURE 3. Whether the filter output is in phase with the oscillator output or 180° out of phase with the oscillator output, of course, depends upon which of the two spots 24a or 25a has the greater intensity. This desired phase relationship can normally be obtained through the proper adjustment and dimensioning of the shutter S. However, if desired, an adjustable phase shifting network may be interposed between filter 36 and adder 37 so that the relationship shown in FIGURE 3 can always be obtained.

It will be noted that if the output from the filter 36 is in phase with the output of oscillator 32 as shown in graph b of FIGURE 3, the wave forms will add directly to produce the wave form shown in graph c of FIGURE 3. On the other hand, if the relative intensities of the two spots are the reverse of that for which the system is adjusted, the output of filter 36 will, as shown in graph d of FIGURE 3, be 180° out of phase with the output of oscillator A and these wave forms will subtract to produce the sum or output from the adder as shown in graph e of FIGURE 3.

The output from oscillator 32 is applied via rectifier 40 to the comparison circuit 41. Similarly, the output of the adder is applied through rectifier 42 to the comparison circuit 41. It will be apparent to those skilled in the art that the rectifiers 40 and 42 may be of any desired type to derive either a peak or average D.-C. signal from these wave forms the only requirement being that they must both be of the same type. The comparison circuit is either a differential amplifier or may, for example, comprise an inverter in one of its inputs and an adder circuit for the output of the inverter and the other input, its characteristic being that it derives a D.-C. output signals equal to the difference between its two input signals, and the polarity of which depends upon which of these two input signals is larger than the other.

Returning to a consideration of FIGURE 3 and the circuit shown in FIGURE 1, it will be apparent that when the two spots have equal intensity, there will be no output from filter 36, the D.-C. component being blocked by capacitor 35 and there being no A.-C. component. Under these conditions, the output from the comparison circuit will also be zero since it is comparing the rectified output from rectifier 40 derived directly from the oscillator to the same output derived through adder 37 (which of course, has a gain of unity) and rectifier 42, there being no component added in this branch since the output of filter 36 under these conditions is zero. If the intensity of spot 24a exceeds that of spot 25a an output will appear from filter 36 which will be added in adder 37 to the output from oscillator 32 and will thereby provide an error signal from comparison circuit 41. The phase relationships illustrated in FIGURE 3 and the adjustment of directional response of motor 43 are, of course, adjusted so that the polarity of the output signal from comparison circuit 41 is such as to drive the motor 43 in a direction to reduce the indicated error by rotating the prism 21 in a direction such as to cause the two spots to become of equal intensity. When the spots become of equal intensity, the output from filter 36 is zero and ideally, the motor 43 should stop. If, however, there is any tendency for over-correction, it will be appreciated that the other spot will now become of greater intensity, the phase of the signal from filter 36 will go through a 180° reversal with respect to the phase of the signal from oscillator 32, this signal will, therefore, subtract from the oscillator signal in adder 37 rather than adding to it, and the polarity of the output signal from comparison circuit 41 will consequently be reversed, thereby driving motor 43 in the opposite direction so as to damp out the over-correction. The system of FIGURE 1 is, thus, a type of servo-system and all of the known considerations of stability, response time, etc., pertaining to any servo are applicable thereto.

While the potentiometer 45 is shown in schematic form only, it will, of course, be understood that in practice it will be a circular potentiometer the arm 44 of which is driven by motor 43 synchronously with the rotation of prism 21 by motor 43. Such pick-off potentiometers to indicate the degree of rotation of a member are well known in the art and need not be further described here. It is sufficient to note that a voltage from the battery 46 is applied to one end of the circular potentiometer whereas the other end may conveniently be grounded and that the voltage appearing in the output or volt meter 47 will be proportional to the position of arm 44 which in turn is proportional to the degree of rotation of the prism 21. That is to say, the output voltage schematically indicated at volt meter 47 is a direct measure of the angle $\phi$ through which the prism 21 has been rotated. Turning to FIGURE 5, it will be noted that for the mercury gas system the relationship between the angle $\phi$ and the strength of the magnetic field H applied to the resonance tube is given by the plot therein. It follows that if the dial of the volt meter 47 is calibrated in accordance with the plot of FIGURE 5, the volt meter may be caused to read the field strength directly. Of course, any other suitable output may be used in place of volt meter 47. Thus, if one is interested (as in practice may well be the case), in changes in the magnitude of the magnetic field exceeding a predetermined amount, it is obvious that the output voltage from pick-off arm 44 may be differentiated and applied to any suitable comparison, control or computing circuits.

Figure 6:
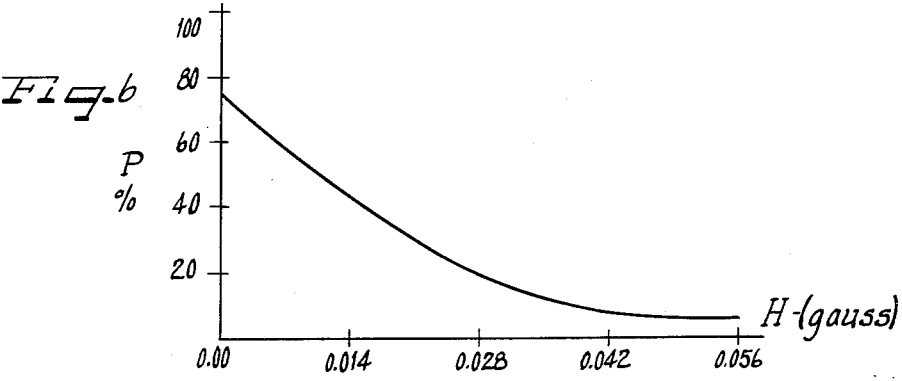
FIGURE 6 is a graph similar to the graph of FIGURE 4 but showing the same data plotted for cadmium gas rather than for mercury gas.

While the apparatus of FIGURE 1 has been discussed and illustrated using mercury vapor in resonance tube 16 and light derived from a mercury arc, it was noted above that other vapors may be used some of which will afford a more sensitive system. It can be shown theoretically, and experimental measurement verifies, that the polarization as a function of field strength is determined by an expression one of the major variables of which is the mean lifetime of the excited state of the atom of the vapor in the resonance tube 16. The rate of change of polarization with field strength has an intimate connection with T, the lifetime of the excited state. This relationship would indicate that the longer the lifetime of the excited state, the more drastic is the change in polarization with field strength. This may be seen by a comparison of FIGURES 4 and 6, FIGURE 4 being a plot of polarization as a function of field strength for mercury vapor and FIGURE 6 being a plot of polarization as a function of field strength for cadmium vapor. The state lifetime for mercury is 1.08 ($10^{-7}$) seconds whereas for cadmium it is 2.3 ($10^{-6}$) seconds. If one desires states of even longer lifetime, zinc vapor can be used in a system deriving incident light from a zinc arc. Here, the excited state lifetime in zinc is $10^{-5}$ seconds and the polarization goes from an initial value of 67% at 0 field strength to half that value of polarization when a field of only 5 ($10^{-4}$) gauss is applied. It has also been found that the rate of change of polarization as a function of field strength may be increased by mixing foreign gases with the mercury vapor in the resonance tube. One such suitable gas is deuterium. Similar effects may be had by mixing foreign gases with zinc.

Many factors will, of course, enter into the ultimate sensitivity of such a system. Thus, the polarizers will not polarize perfectly or analyze completely. However, in a null reading system of this type, calibration can, to a large extent, overcome this difficulty. Random noise at the low current levels available from the photomultiplier output can likewise be combated by this matching procedure. Detection and processing of the output signal from the rotatable prism and servo loop is, in fact, the most limiting factor. It has been established that matching of the intensities of the two spots can be achieved to an accuracy of one part in 10,000. The quantity actually measured, of course, is the angle $\phi$ or the amount of rotation of prism 21 since the polarization P is equal to the cosine of twice this angle. This angle $\phi$ can easily be determined within 0.1 degree and with reasonable care and with high quality components may be determined to 0.01 degree. Taking even the larger number in conjunction with the above data (that is, the experimental fact that zinc polarization changes in value from 67% to 33% while the magnetic field changes from 0 to $5 \times 10^{-4}$ gauss) a reasonable evaluation of sensitivity can be made. The angle $\phi$ changes from 48° to 71°, or some 23° with this above-noted change in the polarization of zinc resonance radiation. Changes of $\frac{1}{230}$ are detectible since we know the angle can be measured to at least $\frac{1}{10}$ of a degree. It follows that the sensitivity is $\frac{1}{230} \times 5 \times 10^{-4}$ which equals 2.1 ($\times 10^{-6}$) gauss. If $\phi$ is measured to 0.01 degree, this is improved by a factor of 10. Note that this calculation assumes a linear change in polarization with field, a phenomenon not in fact observed. However, any increase in the rate of change of polarization with field would also increase the sensitivity thereby producing even better results. As noted above, mixing foreign gases with zinc vapor is likewise another means of increasing the sensitivity since this would further change the slope of the polarization versus field curve in the region being utilized.

For applications in which one wishes to determine either or both the magnitude and direction, or the changes in magnitude or direction of an unknown magnetic field, the apparatus shown in FIGURE 1 may be modified as shown in FIGURE 7. In this embodiment of the invention, the rotatable prism 21 is initially and permanently set to the angle $\phi$—at which the intensities of the two spots 24a and 25a will be equal when the resonance tube 16 is in a region of zero magnetic field strength, that is to say, when the resonance tube 16 is in a magnetic field free region. As may be seen from the graph of FIGURE 5, this angle is approximately 17° for a mercury system. A configuration of Helmholtz coils or other controllable magnetic field producing devices is then used to surround the resonance tube 16 in such a fashion as to create a field equal and opposite to that of the unknown ambient field so that the net field in the resonance tube 17 is zero as indicated by the polarization data observed. From a knowledge of the configuration of the Helmholtz coils and the currents therein, one can then readily compute the field produced by these coils. When these coils have produced a field such that the intensities of the two spots 24a and 25a are equal, with prism 21 set at the predetermined angle noted above, one concludes that there is a zero net field in the resonance tube 16 and that therefore the unknown ambient field has a magnitude and direction equal to and opposite from that of the magnetic field produced by the Helmholtz coils.

It will be noted that in the system of FIGURE 7 it is no longer specified that the direction of observation of the resonance radiation from resonance tube 16 must be in the direction of the applied field since the net applied field in the null condition which is of interest is zero. It, therefore, makes no difference how the over-all system is orientated with respect to the field to be measured. It will, however, be noted that observation of the resonance radiation is still made in a direction perpendicular to the direction of the vector K, the wave vector of the incident polarized light 15 which is polarized in the same manner as the ray 15 of FIGURE 1. This ray 15 is shown in FIGURE 7 as being derived from a polarized light source 14a which may, for example, comprise an arc source 10 and polarizing Wollaston prism 14 as shown in FIGURE 1.

Helmholtz coils 70, 71 and 72 may be of a type which are well-known in the art and are, for example, described as to their structure and characteristics in connection with FIGURE 140 on page 266 of a book entitled, "Principles of Electricity" by L. Page and N. I. Adams, tenth printing, April 1944, by D. Van Nostrand Co., New York, New York. As noted therein, each pair of Helmholtz coils consists of two coils of the same predetermined radius connected in series so that the same current will flow through each coil and positioned coaxially in parallel planes a predetermined distance apart. The magnetic intensity at the mid-point of the common axis of the two coils is then given by the expression $2.86\pi I/A$ where $A$ is the common radius of the two coils and $I$ is the current flowing in the coils. The pair of Helmholtz coils 70 are, of course, arranged with one coil parallel to each of two opposite sides of the resonance tube 16, the common axis of these coils having a direction indicated by the vector $H_x$. Another pair, 71, of said coils are positioned on another pair of opposite surfaces of the cubical resonance tube 16 having their axis in the direction of the vector $H_y$. Similarly, a third pair, 72, of coils are positioned on the third opposite pair of surfaces of the cubical resonance tube 16 such that their axis (and consequently the magnetic field produced by them) has the direction indicated by the vector $H_z$. The coils 70 are connected on one end to ground and on the other end through a milliammeter or other current indicating device 73 to a variable source of voltage 74. The other side of the source 74 may be connected through a fixed resistor 75 back to ground so that a voltage proportional to the current flowing in the circuit may also be derived through a switch 76 if desired. milliammeter 77, variable source of voltage 78, resistance 79 and switch 80 complete a similar circuit for the Helmholtz coils 71. Likewise, milliammeter 81, variable source of voltage 82, resistor 83, and switch 84 complete a similar circuit for the Helmholtz coils 72.

When switches 76, 80 and 84 are closed, the voltages across resistors 75, 79 and 83, which indicate the magnitude of the currents in the associated Helmholtz coils, are applied to the input of a computer 85. If, as is preferable, a digital computer is used at 85, the inputs would, of course, include analog to digital converters. The purpose and programming of this computer will be explained in greater detail below. The rest of the apparatus shown in FIGURE 7 is similar to that shown and discussed in FIGURE 1 and has been correspondingly indicated by like reference characters. This remaining apparatus will, therefore, not be further discussed in detail.

In the operation of the system of FIGURE 7, rotatable prism 21 is initially set at the angle $\phi$ with respect to prism 20 at which the two spots 24a and 25a will have equal intensity when the net field surrounding resonance tube 16 is zero. As noted, this angle for a mercury system is approximately 17° and the appropriate angle can readily be determined by those skilled in the art from experimental data for any particular gas. The variable voltage sources 82, 78, and 74 are then adjusted to produce initial current in the three pairs of Helmholtz coils which will produce a net magnetic field of a magnitude which is reasonably supposed to be equal and opposite to the magnitude of the expected unknown ambient field. It is, of course, unlikely that the initial estimated adjustment will entirely cancel out the ambient field and the two spots 24a and 25a will, therefore, not be of equal intensity. In the same manner as explained in connection with the system of FIGURE 1, the relative intensities of these spots are measured by the shutter S and lens system L1-L2 producing from the photo-multiplier 29 an output signal which is applied through capacitor 35, filter 36 and added 37 to the input of comparison circuit 41 which has as its other input the signal derived from oscillator 32 which is also driving the motor 30 or shutter S. As explained in connection with FIGURE 1, the output of the comparison circuit 41 will be zero when the two spots 24a and 25a are of equal intensity and will have a polarity and magnitude which is a measure of the difference of intensity between these spots. The output of comparison circuit 41 may be applied to an indicator 87 which may, for example, be a simple zero center volt-meter or oscilloscope or any other convenient measuring and indicating device which is used in the manual operation of the system of FIGURE 7. Alternatively, this output may be applied through switch 86 as another input to the computer 85 if the system is to be used in an automatic manner.

In the manual mode of operation, the variable voltage source 74 (or an equivalent rheostat or potentiometer) is next adjusted until the voltage shown by indicator 87 reaches the minimum value possible with the other fixed settings of sources 78 and 82. This optimum possible setting of voltage source 74 is then left fixed and voltage source 78 is similarly adjusted for the optimum setting at which the magnitude of the output of comparison circuit 41 is as close to zero as possible. The same procedure is then carried through for source 82 and is repeated in sequence for the sources 74, 78 and 82 until the output of comparison circuit 41 is seen to be zero as shown by indicator 87. When the output of comparison circuit 41 is zero, the intensities of the two spots 24a and 25a are equal for the angle $\phi$ indicating zero net magnetic field in the area of the resonance tube 16. It may, therefore, be concluded that the ambient magnetic field is equal to and opposite to the total field produced by the three pairs of Helmholtz coils 70, 71 and 72. The field produced by these three pair of Helmholtz coils may in turn be deduced from a knowledge of the currents flowing through each of these coils as indicated by the milliammeters 73, 77 and 81 or as indicated by the voltages across resistors 75, 79 and 83. Since the current values in the coils and the geometry and configuration of the coils is known, the magnitude and direction of the field produced by each pair of coils may readily be deduced in accordance with the above noted discussion of the properties of Helmholtz coils in the book by Page and Adams. The total field produced at the resonance tube by the three pairs of coils will then be the vector sum of the three individual fields.

It will be understood that the manual mode of operation is best suited to measurement of the magnitude and direction of constant magnetic fields in which accurate settings are made as described above and the magnitude and direction of the field is then computed either by hand or by a separate computing apparatus. If the unknown field varies in magnitude and/or direction, it may be desirable to automatically adjust the currents in the coils to follow these variations. For this purpose, the general purpose digital computer 85 may have supplied thereto as input information the values of currents in the three Helmholtz coils by closing switches 76, 80 and 84 to read the voltages across resistors 75, 79 and 83. Similarly, the output of the comparison circuit 41 may be supplied to the computer as another piece of input information by closing the switch 86. The computer may then be programmed in accordance with well-known techniques in the art to control auxiliary digital apparatus to carry out the equivalent of the sequential manual adjustment of the voltage sources 74, 78, and 82 as discussed above for the manual mode of operation. That is to say, the computer would be programmed to vary the current in Helmholtz coil 70 until the output of comparison circuit 41 reached a minimum, to then proceed to vary the current in Helmholtz coil 71 until a similar condition is achieved, and to sequentially continue this process for Helmholtz coils 72, 70, 71, 72, etc., until the output of comparison circuit 41 is zero. When a zero signal is received from comparison circuit 41, the computer may be programmed to compute the magnitude and direction of the field applied by the Helmholtz coils which, of course, will be equal and opposite to the unknown ambient field. If the ambient field changes, the computing and adjusting process starts again until a new value is obtained. Operated on a continuous basis such a system is essentially a digital servo the response time of which will determine the rapidity with which changing fields may be followed.

It will of course be understood that the details of the circuitry of computer 85 or the manner of programming this computer to control auxiliary current adjusting apparatus do not form a part of the present invention since they present a relatively routine design problem to those skilled in the digital arts. The present invention as illustrated in the embodiment of FIGURE 7 can be adequately carried out by manual adjustment of the currents in the three pairs of Helmholtz coils either for fixed or slowly changing fields and is not necessarily dependent upon any form of automatic circuitry. The details of the computer circuitry and programming are therefore not set forth herein.

As noted above in connection with the system of FIGURE 1, the system of FIGURE 7 may also employ many different types of gases in the resonance tube 16, it being only necessary that the polarized light applied to the resonance tube also be derived from a like arc source. The same considerations of sensitivity of the system discussed in connection with FIGURE 1 would also of course apply to the system of FIGURE 7. One advantage of the system of FIGURE 7 resides in the fact that all adjustments and measurements are electrical.

As another alternative method of measuring an unknown magnetic field vector, a measurement of the angle of zero polarization could be made. Thus, the angle between the electric vector of the incident light and the vector of the applied magnetic field could be measured. Since the electric vector direction is known, the direction of the magnetic field can easily be deduced. Evaluation of the change in the polarization as one leaves the angle of zero polarization would furnish a method of computing the magnitude of the applied field.

While the principles of the invention have now been made clear, there will be immediately obvious to those skilled in the art many modifications in structure, arrangement, proportions, the elements and components used in the practice of the invention and otherwise, which are particularly adapted for specific environments and operating requirements without departing from those principles. The appended claims are therefore intended to cover and embrace any such modifications within the limits only of the true spirit and scope of the invention.

I claim as my invention:

1. A method of measuring a characteristic of a magnetic field comprising the steps of, positioning a vapor of a material of known atomic properties in said field, said vapor when excited emitting resonance radiation of a predetermined frequency, exciting said vapor by directing polarized radiation of the same said predetermined frequency thereon, passing said emitted resonance radiation through an analyzer to derive two differently polarized rays of said resonance radiation, sensing the relative intensities of said two rays, varying the means of sensing until said two intensities are equal, and measuring the degree of variation of the means of sensing as a measure of said characteristic of said magnetic field.

2. A method of measuring the magnitude of a magnetic field comprising the steps of, positioning a vapor of a material of known atomic properties in said field, said vapor when excited emitting resonance radiation of a predetermined frequency, exciting said vapor by directing polarized radiation of the same said predetermined frequency thereon, passing said emitted resonance radiation through an analyzer to derive two differently polarized rays of said resonance radiation, deriving an electrical signal having an amplitude proportional to the difference of the intensities of said two rays, varying the magnitude of the effective intensity of one of said rays to reduce said variation to zero and measuring the magnitude of said variation as a measure of the magnitude of said magnetic field.

3. Apparatus for measuring the magnitude of a magnetic field comprising, a resonance tube containing vapor of a material of known atomic properties, said vapor emitting resonance radiation of a predetermined frequency when excited by radiation of the same said frequency, means to excite said vapor by directing radiation of said predetermined frequency into said resonance tube, an analyzer positioned to resolve said emitted resonance radiation into two differently polarized rays, means to derive an electrical signal having an amplitude proportional to the difference of the intensities of said two rays, means to vary the magnitude of a parameter of observation to reduce said electrical signal to zero, and means to measure the magnitude of said parameter as a measure of the magnitude of said magnetic field.

4. A method of measuring the magnitude of a magnetic field comprising the steps of, positioning a vapor of material of known atomic properties in said field, said vapor when excited emitting resonance radiation of a predetermined frequency, exciting said vapor by directing polarized radiation of the same said predetermined frequency thereon, passing said emitted resonance radiation through an analyzer to derive two differently polarized rays of said resonance radiation, deriving an electrical signal having an amplitude proportional to the diffference of the intensities of said two rays, rotating said analyzer to reduce said intensity difference and said electrical signal to zero, and measuring the angle through which said analyzer is rotated as a measure of the magnitude of said magnetic field.

5. Apparatus for measuring the magnitude of a magnetic field comprising, a reasonance tube containing vapor of a material of known atomic properties, said vapor emitting resonance radiation of a predetermined frequency when excited by radiation of the same said frequency, means to excite said vapor by directing radiation of said predetermined frequency on said resonance tube, an analyzer positioned to resolve said emitted resonance radiation into two differently polarized rays, means to derive an electrical signal having an amplitude proportional to the difference of the intensities of said two rays, means controlled by said signal to rotate said analyzer to reduce said difference of intensities and said electrical signal to zero, and means to measure the angle through which said analyzer is rotated as a measure of the magnitude of said magnetic field.

6. A method of measuring the magnitude and direction of an unknown magnetic field comprising the steps of, positioning a vapor of a material of known atomic properties in said field, said vapor when excited emitting resonance radiation of a predetermined frequency, exciting said vapor by directing polarized radiation of the same said predetermined frequency thereon, passing said emitted resonance radiation through an analyzer of known angular setting to derive two differently polarized rays of said resonance radiation, observing the relative intensities of said two rays, creating an opposing magnetic field of known magnitude and direction in said vapor, varying said known magnetic field until said two radiation intensities are equal, and measuring said known magnetic field when said two intensities are equal as a measure of said unknown magnetic field.

7. Apparatus for measuring the magnitude and direction of an unknown magnetic field comprising, a resonance tube containing vapor of a material of known atomic properties, said vapor emitting resonance radiation of a predetermined frequency when excited by radiation of the same said frequency, means to excite said vapor by directing radiation of said predetermined frequency into said resonance tube, an analyzer positioned to resolve said resonance radiation into two differently polarized rays, means to compare the intensities of said rays, means to create an opposing magnetic field at said resonance tube, means to vary said opposing magnetic field to reduce the difference of intensity between said rays to zero, and means to measure said opposing magnetic field when said intensity difference is zero as a measure of said unknown magnetic field.

8. Apparatus for measuring the magnitude of a magnetic field comprising, a resonance tube containing vapor of a material of known atomic properties, said vapor emitting resonance radiation of a predetermined frequency when excited by radiation of the same said frequency, means to excite said vapor by directing polarized radiation of said predetermined frequency on said resonance tube, said polarized radiation also being directed perpendicularly to said magnetic field, an analyzer positioned to receive said resonance radiation emitted in the direction of said magnetic field, said analyzer resolving said radiation into two differently polarized rays, means to derive an electrical signal having a characteristic proportional to the difference of the intensities of said two rays, means controlled by said electrical signal to rotate said analyzer to reduce said electrical signal to zero, and means to measure the magnitude of the angle through which said analyzer is rotated as a measure of the magnitude of said magnetic field.

9. Apparatus for measuring a characteristic of a magnetic field comprising, a resonance tube containing vapor of a material of known atomic properties, said vapor emitting resonance radiation of a predetermined frequency when excited by radiation of the same said frequency, means to excite said vapor by directing radiation of said predetermined frequency into said resonance tube, an analyzer positioned to resolve said emitted resonance radiation into two differently polarized rays, a photoelectric transducer positioned to receive said rays, shutter means positioned between said analyzer and said photoelectric transducer, said shutter means being driven at a second predetermined frequency to alternately block and transmit the light of each of said rays to said photoelectric transducer whereby the electrical output signal of said photoelectric transducer has an alternating current component the fundamental frequency of which is said second predetermined frequency and the amplitude of which is proportional to the difference of intensities between said rays, and means to vary a means for sensing said magnetic field to reduce said alternating current component to zero amplitude.

10. Apparatus for comparing the intensities of two separate rays of light comprising, a photoelectric transducer positioned to receive said rays of light, an oscillator, means operated at the frequency of said oscillator to alternately transmit the block each of said rays of light to said photoelectric transducer, an adder circuit, means to apply the output of said photoelectric transducer as one input to said adder circuit, means to apply a signal from said oscilator as the second input to said adder circuit, an means to compare said signal from said oscillator to the output of said adder circuit as a measure of the difference of the intensities of said rays.

11. Apparatus for measuring an unknown magnetic field comprising, a resonance tube containing vapor of a material of known atomic properties, said vapor emitting resonance radiation of a predetermined frequency when excited by radiation of the same said frequency, means to excite said vapor by directing radiation of said predetermined frequency into said resonance tube, magnetic field generating means to create an opposing magnetic field at said resonance tube, means to observe a characteristic of said resonance radiation emitted from said resonance tube as a measure of the total magnetic field at said resonance tube, means to vary said opposing magnetic field to reduce said total magnetic field to zero, and means to measure said opposing magnetic field as a measure of said unknown magnetic field.

12. Apparatus for measuring the magnitude and direction of an unknown magnetic field comprising, a resonance tube containing vapor of a material of known atomic properties, said vapor emitting resonance radiation of a predetermined frequency when excited by radiation of the same said frequency, means to excite said vapor by directing radiation of said predetermined frequency into said resonance tube, an analyzer positioned to resolve said resonance radiation emitted from said tube into two differently polarized rays, means to compare the intensities of said rays, means comprising three pairs of Helmholtz coils positioned on three mutually perpendicular axes intersecting in said resonance tube to create an opposing magnetic field at said resonance tube, means to vary the current through each of said three pairs of Helmholtz coils to reduce the difference of intensities between said rays to zero, said analyzer having a predetermined position such that said zero intensity difference indicates a zero total magnetic field at said resonance tube, and means to measure the currents in said Helmholtz coils as a measure of said unknown magnetic field.

13. Apparatus for measuring the magnitude and direction of an unknown magnetic field comprising, a resonance tube containing vapor of a material of known atomic properties, said vapor emitting resonance radiation of a predetermined frequency when excited by radiation of the same said frequency, said resonance radiation having a polarization which varies as a function of the total magnetic field in said resonance tube, means to excite said vapor by directing radiation of said predetermined frequency into said resonance tube, magnetic field generating means to create an opposing magnetic field in said resonance tube, means to vary said opposing magnetic field, means to observe the polarization of said emitted resonance radiation to detect a condition of zero total magnetic field in said resonance tube, and means to measure said opposing magnetic field as a measure of said unknown magnetic field.

14. Apparatus for measuring the magnitude of a magnetic field comprising, a resonance tube containing vapor of a material of known atomic properties, said vapor emitting polarized resonance radiation of a predetermined frequency when excited by radiation of the same said frequency, means to excite said vapor by directing polarized radiation of said predetermined frequency into said resonance tube, said radiation also being directed perpendicularly to the direction of said magnetic field and having its electric vector mutually perpendicular to the direction of propagation of said radiation and to the direction of said magnetic field, an analyzer positioned to resolve said resonance radiation emitted in the direction of said magnetic field into two differently polarized rays, a photoelectric transducer positioned to receive said rays, a shutter positioned between said analyzer and said photo-electric transducer to alternately block and transmit each of said rays, an oscillator, the operation of said shutter being controlled at a second predetermined frequency by a signal derived from said oscillator, an adder circuit, means to apply the alternating current component of the output of said photo-electric transducer and a signal derived from said oscillator as inputs to said adder circuit, said alternating current component of the output of said photoelectric transducer being zero when said two rays have equal intensities and otherwise having an amplitude which is proportional to the difference between their intensities and a phase which is either in phase with or 180° out of phase with the signal from said oscillator depending upon which of said rays has the greater intensity, means to compare the amplitude of said signal derived from said oscillator with the output from said adder circuit to derive a unidirectional signal having an amplitude proportional to the difference in said compared amplitudes and a polarity depending upon which of said compared signals has the larger amplitude, means controlled by said unidirectional signal to rotate said analyzer to reduce said unidirectional signal to zero, and means to measure the angle through which said analyzer is rotated as a measure of said magnetic field.

15. A method of measuring the intensity of an extrinsic magnetic field which comprises the steps of subjecting a vapor in a resonance radiation system to exciting polarized radiation impinging on said vapor along an exciting radiation axis of the system under conditions causing said vapor to emit resonance radiation, producing an output resonance radiation signal from the system which is a function of the magnetic field impinging on said vapor along a magnetic field axis of the system and which is also a function of the polarization of the resonance radiation emitted from said vapor, selecting the composition of said vapor in the system to provide an output resonance radiation signal from said system whose output signal amplitude as a function of the magnetic field intensity impinging on said vapor and directed along said magnetic field axis of said system is a substantially smooth continuous output signal curve which curve directly corresponds with a known polarization versus magnetic field intensity curve from an initial relatively high value of polarization corresponding to a first output signal amplitude and associated with a zero value of magnetic field intensity along said magnetic field axis and a relatively high value of negative slope of the polarization curve to a relatively low value of polarization corresponding to a second output signal amplitude and associated with a limiting value of magnetic field intensity along said magnetic field axis greater than the maximum intensity of an extrinsic magnetic field to be measured and a relatively low value of negative slope of said polarization curve, subjecting said vapor to a magnetic field extrinsic to said system and of intensity greater than zero but less than said limiting value of magnetic field intensity for said system, and obtaining a quantitative indication of the effect of said extrinsic magnetic field upon the amplitude of said output resonance radiation signal from said system as a measure of the intensity of said extrinsic magnetic field.

16. A method of measuring the intensity of an extrinsic magnetic field which comprises the steps of subjecting a vapor in a resonance radiation system to exciting polarized radiation impinging on said vapor along an exciting radiation axis of the system under conditions causing said vapor to emit resonance radiation, producing an output resonance radiation signal from the system which is a function of the magnetic field impinging on said vapor along a magnetic field axis of the system and which is also a function of the polarization of the resonance radiation emitted from said vapor, selecting the composition of said vapor in the system to provide an output resonance radiation signal from said system whose output signal amplitude as a function of the magnetic field intensity impinging on said vapor and directed along said magnetic field axis of said system is a substantially smooth continuous output signal curve which curve directly corresponds with a known polarization versus magnetic field intensity curve from an initial relatively high value of polarization corresponding to a first output signal amplitude and associated with a zero value of magnetic field intensity along said magnetic field axis and a relatively high value of negative slope of the polarization curve to a relatively low value of polarization corresponding to a second output signal amplitude and associated with a limiting value of magnetic field intensity along said magnetic field axis greater than the maximum intensity of an extrinsic magnetic field to be measured and a relatively low value of negative slope of said polarization curve, subjecting said vapor to a magnetic field extrinsic to said system and of intensity greater than zero but less than said limiting value of magnetic field intensity for said system, moving said resonance radiation system as a unit through said extrinsic magnetic field, continuously adjusting the angular orientation of the system to maintain a constant relationship between the magnetic field axis of the system and the direction of said extrinsic magnetic field, and obtaining a quantitative indication of the effect of said extrinsic magnetic field upon the value of the output resonance radiation signal amplitude from the system as a measure of the intensity of said extrinsic magnetic field along the path of movement of the system therethrough.

17. A method of measuring the intensity of an extrinsic magnetic field which comprises the steps of subjecting a vapor in a resonance radiation system to exciting plane polarized radiation impinging on said vapor along an exciting radiaton axis of the system under conditons causing said vapor to emit resonance radiation, producing an output resonance radiation signal from the system which is a function of the magnetic field impinging on said vapor along a magnetic field axis of the system and which is also a function of the polarization of the resonance radiation emitted from said vapor, selecting the composition of said vapor in the system to provide a polarization signal reflecting the polarization of the resonance radiation emitted from said vapor whose polarization signal amplitude as a function of the magnetic field intensity impinging on said vapor and directed along said magnetic field axis of said system is a known substantially smooth continuous polarization curve of negative slope extending from an initial relatively high value of polarization corresponding to a zero value of magnetic field intensity along said magnetic field axis and a relatively high value of negative slope of the polarization curve to a relatively low value of polarization corresponding to a value of magnetic field intensity along said magnetic field axis of less than .056 gauss and a relatively low value of negative slope of said polarization curve approaching zero slope thereof, subjecting said vapor to a magnetic field extrinsic to said system and of intensity greater than zero but substantially less than said limiting value of magnetic field intensity for said system and substantially less than .056 gauss, moving said resonance radiation system as a unit through said extrinsic magnetic field, controlling the angular orientation of the system as it is moved through said extrinsic magnetic field to maintain the magnetic field axis of the system in substantially coincident relationship to the direction of said extrinsic magnetic field, and continuously obtaining a quantitative indication of the effect of said extrinsic magnetic field upon the amplitude of the output resonance radiation signal from the system as a measure of the intensity of said extrinsic magnetic field at successive points along the path of movement of the system therethrough.

References Cited by the Examiner

UNITED STATES PATENTS

| 2,383,075 | 8/45 | Pineo | 88—14 |
| 2,430,833 | 11/47 | Stearns et al. | 88—14 |
| 2,503,808 | 4/50 | Eearl et al. | 88—14 |
| 2,829,555 | 4/58 | Keston | 88—14 |
| 2,836,791 | 5/58 | Kaplan | 324—43 |
| 2,844,789 | 7/58 | Allen | 324—43 |

OTHER REFERENCES

"A New Double Resonance" method for investigating atomic energy levels. Application to Hg3P$_1$, by Jean Brossel et al., Physical Review, vol. 86, No. 3, May 1, 1952, pp. 308–316.

Journal of Geophysical Research, vol. 63, No. 3, September, 1959, pp. 513–515.

Physical Review, vol. 107, No. 6, September 15, 1957, pp. 1559–1565, by Bell et al.

"The Hyperfine Structure of the 3P$_{3/2}$ State of Na [23]," by Paul L. Sagalyn, Physical Review, vol. 94, No. 4, May 15, 1954, pp. 885–892.

WALTER L. CARLSON, *Primary Examiner.*

SAMUEL BERNSTEIN, LLYOD MCCOLLUM, FREDERICK M. STRADER, *Examiners.*